United States Patent Office 3,461,103
Patented Aug. 12, 1969

3,461,103
WATER DISPERSIBLE POLYURETHANE PLASTICS PREPARED FROM CYCLIC COMPOUNDS
Wolfgang Keberle, Bergisch-Neukirchen, Dieter Dieterich, Leverkusen, and Otto Bayer, Burscheid, Germany, assignors to Farbenfabriken Bayer Aktiengesellschaft, Leverkusen, Germany, a corporation of Germany
No Drawing. Filed Sept. 24, 1965, Ser. No. 490,117
Claims priority, application Germany, Sept. 26, 1964, F 44,077
Int. Cl. C08g 23/20
U.S. Cl. 260—75                                     7 Claims

ABSTRACT OF THE DISCLOSURE

Water dispersible polyurethane plastics prepared by reacting a polyurethane having a molecular weight of about 5,000 to about 2,000,000 with an organic compound having a cyclic ring of 3 to 7 ring members and then reacting the resulting product with a base to form a salt of said polyurethane.

---

This invention relates to polyurethanes and more particularly to improved water dispersible polyurethanes.

It has been proposed heretofore to prepare polyurethane latex where the polyurethane is made water dispersible with the aid of an emulsifier or by the incorporation of tertiary nitrogen atoms which can be quaternated. Furthermore, it has been known heretofore to react an —NCO terminated prepolymer with a dicarboxylic acid and then react the remaining acid groups with a base such as sodium hydroxide to form a salt which is water soluble. This heretofore known method, however, results in products which are either not compatible with alkalies due to the presence of the quaternated tertiary nitrogen atoms, which are subject to the use of large amounts of emulsifying agents in order to produce a stable dispersion or in the later case where the sodium salt is formed the chain is terminated and the reactive site is lost. It would, therefore, be desirable to have a polyurethane polymer which could be dispersed in water without an emulsifier and which would be compatible with alkalies and compounds that split off bases.

It is, therefore, an object of this invention to provide for the preparation of water dispersible polyurethanes which are free of the foregoing disadvantages. Another object of this invention is to provide for water dispersible polyurethanes, as well as a method for the preparation thereof, which are compatible with alkalies. Still another object of this invention is to provide a method of incorporating salt-like groups into previously prepared polyurethanes without destruction of the —NCO groups which are present. Still a further object of this invention is to provide for the preparation of polyurethane polymers having salt-like groups which are essentially the same functionality with regard to NCO groups as was present before the modification to include salt-like groups. Another object of this invention is to provide improved substantially linear polyurethane polymers which are water dispersible and can be shaped and cross-linked without additional chain extension reactants.

The foregoing objects and others which will become apparent from the following description are accomplished in accordance with the invention, generally speaking, by providing a water dispersible polyurethane having a molecular weight of from about 5,000 to about 2,000,000 which has been reacted with cyclic compounds having 3 to 7 ring members which are capable of salt formation. In other words, the present invention provides for modification of already prepared polyurethane plastics, whether they have free —NCO groups or free active hydrogen containing groups and whether they have been chain extended or not, with cyclic compounds having 3 to 7 ring members which contain salt-like groups or groups which are capable of salt formation after opening the ring.

Without being limited to any particular theory, it is proposed that perhaps the cyclic compound reacts preferentially with active hydrogen atoms along the chain of the preferably substantially linear polyurethane polymer so that the polymer does not become chain terminated and thus non-reactive at these important sites. Rather the cyclic compounds do not have active hydrogen atoms, for example, for reaction with free —NCO groups, open in the presence of the active hydrogen atoms along the chain, for example, amino hydrogen, urethane hydrogen, urea hydrogen or the like and while one end reacts with the nitrogen atoms the other end is left free with an acid like group which can form a salt. The net effect is a polymer which has lost none of its essential reactivity, through —NCO groups if they are present, and only a small amount of its activity through hydrogen groups, if they are present, and yet has gained the capacity to form salts which make the polyurethane water dispersible; even in some cases water soluble. The salt-like groups are usually along the chain where the cause little interference with further reaction. Any —NCO group will form urea groups by reaction with water when dispersed in the water. This additional chain extension prepares a very valuable product.

In accordance with a preferred embodiment of the invention, the cyclic compound having 3 to 7 ring members is reacted with the polyurethane at a temperature of about 20 to about 150° C.

Any suitable organic compound containing active hydrogen containing groups as determined by the Zerewitinoff method may be used for the preparation of the initial polyurethane. These compounds preferably have a molecular weight of about 300 to about 10,000, most preferably 500 to 4000, and are preferably mainly linear. The compounds are preferably those having hydroxyl, carboxyl, amino or mercapto groups. The most preferred being polyhydroxyl compounds such as hydroxyl polyesters, polyacetals, polyethers, polythioethers, polyamides, polyester amides and the like.

Suitable polyethers are, for example, the condensation products of ethylene oxide, propylene oxide, tetrahydrofuran, butylene oxide and copolymerization or graft polymerization products thereof such as, for example, mixed ethylene oxide, propylene oxide condensates as well as products prepared by reacting olefins under high radiation with the alkylene oxide condensates to prepare graft polymerization products. Polyethers are suitable which are prepared by condensation of the aforementioned alkylene oxides with polyhydric alcohols such as ethylene glycol, 1,2-propylene glycol, 1,4-butane diol, glycerine, trimethylolpropane, pentaerythriotol and the like. It is preferred, however, however, to use essentially difunctional compounds although one may use amines such as N-diethanol amine, polyamines such as ethylene diamine, and amino alcohols such as ethanol amine, preferably, however, in minor amount. Suitable polyacetals are the compounds which can be prepared from hexane diol and formaldehyde. The polythioethers are, for example, condensation products of thiodiglycol either alone or in admixture with other glycols such as ethylene glycol, propylene glycol, or polyhydroxy compounds specifically disclosed above. Any suitable polyester which is preferably saturated may be used, including the polyester amides and polyamides obtained, for example, from poly-basic saturated or unsaturated polycarboxylic acids and polyhydric saturated or unsaturated alcohols, diamines, polyamines and the like. Any suitable carboxylic acid may be used such as, for example, adipic acid, succinic acid, phthalic acid, terephthalic acid, maleic acid and the like. Any suitable alcohol may be used such as, for example, ethylene glycol, propylene glycol, butylene glycol, neopentyl glycol, hexane diol, trimehtylolpropane and the like. Any suitable amino alcohol may be used such as ethanol amine, any suitable diamine may be used such as, ethylene diamine, hexamethylene diamine and the like. Polyhydroxyl compounds which already contain urethane or urea groups as well as natural polyols which may be further modified if desired such as castor oil, carbohydrates and the like may also be used.

It is possible especially for the purpose of varying the hydrophilic or hydrophobic character and mechanical properties of the product to use mixtures of different polyhydroxyl compounds.

Any suitable organic polyisocyanate may be used including both aliphatic and aromatic polyisocyanates and preferably diisocyanates such as, for example, 1,5-naphthylene diisocyanate,
4,4'-diphenylmethane diisocyanate,
4,4'-diphenyldimethylmethane diisocyanate,
di- and tetraalkyldiphenylmethane diisocyanate such as
2,2'-dimethyl-4,4'-diphenylmethane diisocyanate,
2,2',3,3',-tetramethyl-4,4'-diisocyanato diphenylmethane and the like;
4,4'-dibenzyldiisocyanate,
1,3-phenylene diisocyanate,
1,4-phenylene diisocyanate,
2,4-toluylene diisocyanate,
2,6-toluylene diisocyanate, mixtures of
2,4- and 2,6- toluylene diisocyanate,
2,6-dichloro-1,4-phenylene diisocyanate,
2,2'-dichloro-4,4'-diisocyanato diphenylmethane,
2,4-dibromo-1,5-diisocyanato naphthalene, phosphorous containing isocyanates such as phenyl di-(4-isocyanato phenyl) - phosphate, butane-1,4-diisocyanate, hexane-1,6-diisocyanate, dicyclohexyl methane - 4,4'-diisocyanate, cyclohexane-1,4-diisocyanate and the like. Of particular interest are partly masked isocyanates which enable the resulting product containing salt-like groups to be cross-linked by simply heating it to a higher temperature. Isocyanates which may be used for this purpose are for example, dimeric-2,4-toluylene diisocyanate as well as polyisocyanates which have had their —NCO groups blocked with phenol, tertiary butanol, phthalimide, caprolactam and the like.

The prepolymer having free —NCO groups which results from the reaction of the organic compound containing active hydrogen containing groups as determined by the Zerewitinoff method and the organic polyisocyanate may, if desired, be further extended with an additional active hydrogen containing compound which preferably has a molecular weight below about 500. Suitable compounds of this type include, for example, alcohols, preferably glycols, amines, preferably diamines, amino alcohols, dicarboxylic acids, amino carboxylic acid and the like.

Any suitable alcohol may be used especially saturated or unsaturated glycols such as ethylene glycol or condensates thereof such as diethylene glycol, triethylene glycol or the like, 1,4-butane diol, propane-1,2-diol, propane-1,3-diol, neopentyl glycol, dihydroxy ethoxy hydroquinone, 1,4-butane diol, dihydroxy ethyl diane, mono- and di-alkoxylated aliphatic, cycloaliphatic, aromatic and heterocyclic primary amines, such as N-methyl diethandamine, N,N - bis - gamma - amino - propyl-N-methylamine, N-oleyl diethanol amines, N-cyclohexyl di-isopropanol amine, N,N-dihydroxy ethyl-p-toluidine, N,N-dihydroxypropylnaphthylamine, polypropoxylated-n butyl diethanol amines such as the reaction product of N-butyl diethanol amine with two mols of ethylene oxide, polypropoxylated N-methyl diethanolamines having a molecular weight of 300 to about 4000, polyesters having tertiary amino groups such as the reaction product of two mols of N-methyl diethanol amine with one mol of adipic acid, dimethyl-bis-oxy-ethyl hydrazine and the like.

The diamine chain extenders may be any suitable aliphatic, cycloaliphatic or aromatic diamine such as, for example, ethylene diamine, hexamethylene diamine, 1,4-cyclohexylene diamine, benzidine-4,4'-diamino diphenylmethane, the isomers of phenylene diamine such as 1,4-phenylene diamine, 1,2-phenylene diamine and the like as well as hydrazine ammonia and the like.

Any suitable amino alcohol may be the chain extender such as ethanolamine, propanolamine, butanolamine or the like.

Any suitable carboxylic acid may be the chain extender such as aliphatic, cycloaliphatic, aromatic and heterocyclic dicarboxylic acid such as oxalic acid, malonic acid, succinic acid, glutaric acid, adipic acid, pimelic acid, suberic acid, azelaic acid, sebacic acid, terephthalic acid, 1,4-phenylene dicarboxylic acid, diphenic acid, the isomeric naphthalic acid such as 1,5-dicarboxylic naphthalic acid, maleic acid, fumaric acid, sulphodiacetic acid, diglycollic acid, thiodiglycollic acid, methylene-bis-thioglycollic acid, the isomeric pyridocarboxylic acids such as quinolinic acid, 1 utidinic acid and other isomeric quinolinodicarboxylic acids and the like.

Any suitable amino carboxylic acid may be the chain extending agent such as, for example, aliphatic, cycloaliphatic, aromatic or heterocyclic amino carboxylic acids such as glycine, alpha, and beta-alanine, 6-aminocaproic acid, 4-aminobutyric acid, the isomeric aminobenzoic acids, p-amino benzoic acid, the isomeric amino naphthoic acids such as 5-aminonaphthoic acid and the like.

The production of the polyurethane masses may be carried out in known manner with or without solvent. Preferably a preadduct is first prepared from the higher molecular weight organic compound having active hydrogen atoms and the polyisocyanate, with or without solvent, preferably at about 100 to about 150° C. and this preadduct is then further reacted at about 20 to about 150° C., if desired in solution, with any chain lengthening agents that may be used. Alternatively, the polyhydroxyl compound may first be mixed with the chain lengthening agents. The reaction may be carried out in the presence of catalysts such as tertiary amines and/or organometallic compounds. The molecular ratio of isocyanate groups to reactive hydrogen atoms preferably lies between about 0.4:1 and 1.5:1, preferably between about 0.9:1 and 1.2:1.

According to a special method of carrying out the process of the invention, polyurethane masses which contain free primary and/or secondary hydroxyl- and/or amino groups are used as starting materials. This special type of polyurethane mass may be produced, for example by carrying out the isocyanate reaction with considerably less than the equivalent quantity of isocyanates, thereby obtaining short chained polyurethane masses with terminal polyhydroxyl groups. An alternative preferred method is to use chain lengthening agents having more than two hydroxyl groups. If polyurethane masses having two primary or secondary amino groups are required, it is possible to start, for example, from polyhydroxyl compounds which already have such amino groups incorporated in them by condensation, in other words, polyester amides and polyamides. In this case it is also more suitable to use higher functional chain lengthening agents. Examples of such higher functional chain lengthening agents, which may be used alone or as only part of the total quantity of chain lengthening agents are: diethylene triamine, triethylene tetramine, tetraethylene pentamine, pentaethylene hexamine, hexaethylene heptamine, glycerol, erythritol, mesoerythritol, arabitol, adonitol, xylitol, mannitol, sorbitol, dulcitol, 1,3 - diaminoisopropanol, 1,2 - diaminopropanol, tris-hydroxymethyl-methyl-aminomethane. 2-amino - 2-methyl- 1,3 - propane diol, 2 - amino-2-ethyl - 1,3-propane diol, 2-amino-1,3-propane diol and the monohydroxy alkylated polyamines such as N-hydroxyethyl-ethylene diamine, N-hydroxy-ethyl hydrazine, N-hydroxyethyl-hexamethylene diamine.

According to the invention, the polyurethane masses described are reacted with cyclic compound having 3 to 7 ring members which contain salt-like groups or groups which are capable of salt formation after the ring opens. These include:

(1) Dicarboxylic acid anhydrides such as succinic anhydride, maleic acid anhydride, phthalic acid anhyride, di-, tetra- and hexahydro-phthalic acid anhydride;
(2) Tetracarboxylic acid dianhydrides such as benzene-1,2,4,5-tetracarboxylic acid dianhydride;
(3) Disulphonic acid anhydrides as benzene-1,2-disulphonic acid anhydride, naphthalene-1,2-disulphonic acid anhydride;
(4) Sulphocarboxylic acid anhydrides such as sulphoacetic acid anhydride, o-sulphobenzoic acid anhydrides;
(5) Sultones such as 1,3-propanesultone, 1,4-butanesultone, 1,8-naphthosultone;
(6) Lactones such as beta-propiolactone, gamma-butyrolactone;
(7) Epoxycarboxylic acids such as glycidic acid, if desired in the form of their salts;
(8) Epoxysulphonic acids such as 2,3-epoxypropane-sulphonic acid-1, if desired in the form of their salts and the sulphite, for example the bisulphite compound of glycidic aldehyde;
(9) 2,4-dioxo-oxazolidines such as N-carboxy-glycine anhydride;
(10) Isatoic acid anhydrides such as 2-(N-carboxyamino)-benzoic acid anhydride;
(11) Phostones such as 3-propyl phosphinous acid phostone, P-phenyl-3-propyl-phosphinic acid phostone, ethyl-3-propyl phosphinic acid phostone;
(12) Reaction products of olefins such as ethylene, propylene and the like with sulphur trioxide, such as carbyl sulphate.

Cyclic compounds especially suitable for the process of the invention are the compounds listed under 1, 5 and 6 such as succinic anhydride, maleic acid anhydride, 1,3-propanesultone, 1,4-butanesultone, beta-propiolactone, gamma-butyrolactone, the sodium hydrogen sulphite addition product of glycidic aldehyde.

The polyurethane masses are reacted with these cyclic compounds preferably at about 20 to about 150° C., if desired, under pressure and if desired in the presence of basic catalysts such as tertiary amines. A polyurethane mass is thereby obtained which contains salt-type groups or groups capable of salt formation which in the presence of basic catalysts are converted into the salt form in situ. In other cases, these groups which may be present are converted at least partly into salts by organic or inorganic bases. In that case, these reagents are added in an organic or inorganic solvent or even without solvent at a temperature between about 20 and about 150° C. Their quantity depends on the quantity of ionic groups present in the polyurethane mass. An excess is only of advantage in the case of volatile compounds that are easily removed. In many cases it is advantageous to use a subequivalent quantity of neutralizing agent in order to insure a certain degree of hydrophobia and adjust the medium to a certain pH. Bi- and polyfunctional neutralizing agents, salt-forming agents and quaternating agents such as polyamines, polyvalent acids and polyhalides are preferably added in excess in order to suppress reaction in either direction, which would lead to chain lengthening or cross-linking. It is suitable to add compounds in which the different groups have a different basicity, acidity or reactivity.

Examples of inorganic and organic bases are:
(1) Monofunctional, primary, secondary and tertiary amines such as methylamine, diethylamine, triethylamine, trimethylamine, dimethylamine, ethylamine, tributylamine, pyridine, aniline, toluidine, alkoxylated amines such as ethanolamine, diethanolamine, triethanolamine, methyldiethanolamine, oleydiethanolamine and polyfunctional polyamines in which the individual amino groups may have different basicity, e.g. the polyamines obtained by hydrogenation of addition products obtained by the addition of acrylonitrile to primary and secondary amines, peralkylated or partialy alkylated polyamines such as N,N-dimethylethylene diamine and compounds such as gamma-aminopyridine, N,N-dimethylhydrazine;

(2) Inorganic bases, compounds which are basic in reaction or split off bases, e.g. ammonia, monovalent metal hydroxides -carbonates and -oxides such as sodium hydroxide, potassium hydroxide, sodium carbonate, potassium carbonate, sodium hydrogen carbonate.

In the reaction of polyurethane masses containing primary and/or secondary amino groups with the above mentioned cyclic compounds, it is also possible to obtain betaines as the salt-like groups; these may remain as they are or converted by reaction with inorganic bases into salts of polyurethanes having anionic characteristics or if desired, they may be reacted with quaternating agents or with acid salt-forming agents to form salts of polyurethanes having cationic characteristics.

Such agents are compounds which contain halogen atoms capable of quaternating reactions or suitable ester groups of strong acids, e.g. methyl chloride, dimethylsulphate, benzyl chloride, ethyl bromo acetate, p-toluene sulphonic acid methyl ester, ethyl chlorohydrin, chloroacetamide, 3-bromopropanol, or compounds which contain acid groups capable of salt formation, e.g. carboxylic acids, sulphonic acids and their derivatives, inorganic acids such as hydrochloric acid or nitric acid, organic acids such as formic acid, acetic acid or lactic acid, or compounds which contain both salt forming and quaternating groups, e.g. halogen carboxylic acids such as chloroacetic acid, and polyfunctional quaternating agents and salt-forming compounds such as polycarboxylic acids, polysulphonic acids, polyvalent inorganic acids, polyhalogen compounds such as tartaric acid, mali cacid, succinic acid, oxalic acid, p-sulphobenzoic acid, benzene disulphonic acid, phosphoric acid, chlorobromobutane or xylylene dichloride in which the individual groups may have different reactivity or acidity.

In the case of polyurethane masses which in addition contain tertiary amino groups, the carboxylic acid and sulphonic acid groups which have been introduced when the cyclic compounds containing 3 to 7 ring members underwent reaction with ring opening may be converted into the salt form by reacting them with the basic tertiary nitrogen atoms contained in the polyurethane masses, and in the process they may produce additional cross-linking effects which manifest themselves in increased strength and elasticity of the products of the process.

The process according to the invention can be carried out without solvent in the molten form, for example on rollers, and the rubber-like masses obtained may then be dissolved in a polar or non-polar organic solvent which may contain water The solvent which may be present may be removed at room temperature or elevated temperature, if desired accompanied by a forming process, or it may be replaced by water. Other methods of converting the polyurethane mass into the aqueous phase can be carried out by placing the organic polyurethane solution with vigorous centrifuging into the given quantity of water and at the same time or subsequently removing the organic solvent, possibly in vacuo, or by injecting the dissolved or solvent-free liquid polyurethane mass into water through nozzles, if desired under pressure.

Ultrasonic vibrations may be used for obtaining a suitable state of distribution in the aqueous phase.

When choosing a solvent, it should be borne in mind that in the preparation of the polyurethane mass, no solvent may be used which contains functional groups that would react with the isocyanate groups under the reaction conditions. In the process of the invention, any solvent may be used that does not enter into reaction with the polyurethane mass, the cyclic alkylating and acylating agents used, the organic and inorganic bases and the compounds used as quaternating agents and salt-forming agents. Preferred solvents are hydrocarbons which may if desired be halogenated, ketones, alcohols, esters, nitriles, e.g. acetone, methyl ethyl ketone, isopropanol, tertiary butanol, acetonitrile, ethanol, methanol, ethyl acetate, methylene chloride, chloroform, carbon tetrachloride, dimethylformamide or dimethylsulphoxide.

The aqueous solutions or dispersion obtained are stable without the addition of emulsifier, although suitable anionic, cationic or neutral emulsifiers or dispersing agents may be added such as casein which has been hydrolyzed with ammonia or lactic acid, fatty alcohol sulphonates, polyvinyl alcohol, hydroxyethylated phenols, polyglycol ethers of oleyl alcohol or natural products such as gelatine, gum arabic, tragacanth, fish glue, agaragar or salts of resinic acids.

The dispersions may be blended with dispersions of the same charge, e.g. the anionic polyurethane dispersions may be blended with polyvinyl chloride-, polyethylene, polystyrene-, polybutadiene- and copolymer resin dispersions.

Finally, fillers, plasticizers, pigments, carbon black and silicic acid resoles and dispersions of aluminum, clay or asbestos may also be worked into the dispersions.

The forming process of the products may be carried out in the presence of cross-linking agents known per se. For this purpose, polyfunctional substances which have a cross-linking action are introduced into the polyurethane masses in the course of the process, and after evaporation of solvent if present, they cause chemical cross-linking at room temperature or elevated temperature. Examples are sulphur, sulphur sols, formaldehyde and substances which give off formaldehyde or react like formaldehyde, free and partially or completely masked polyisocyanates, carbodiimides, polyamines, compounds of divalent metals and of metals of higher valency, e.g. oxides, carbonates, hydroxides of calcium, zinc, magnesium and polyfunctional acid salt-forming and quaternating agents which are suitably used in a subequivalent quantity with respect to the carboxylic acid groups and sulphonic acid groups or tertiary nitrogen groups present in the polyurethane mass for the purpose of effecting cross-linking, and organic and inorganic peroxides. The cross-linking agents, fillers, pigments, blending agents and other additives, which may be present in solution or suspension, may be added in the course of the process to the polyurethane masses which may be dissolved or suspended in an organic solvent or in water, or they may be added to the polyurethane masses on mixing rollers.

The possibility of using polyurethanes of many different compositions in a suitable form for working up opens up many new fields of application. Thus it is possible to produce articles by the dip molding process, foam plastics by the latex churning process, by addition of electrolyte to the aqueous solutions and dispersions it is possible to obtain coagulates which can be worked up on mixing rollers like the solvent-free polyurethane masses, and by evaporation of solvent, if present, it is possible to obtain non-adhesive and adhesive films and foils and crystalline powders. The products of the process are suitable for coating and impregnating woven and non-woven textiles, leather, paper, wood and metals and they can be used as antistatic and crease-resistant finishes and as binders for fleeces, adhesives, adhesifying agent, backing agents, agents for rendering substances hydrophobic, plasticizers, binders for example for cork powder or sawdust, glass fibers, asbestos, paper-like materials plastic- or rubber waste or ceramic materials, as auxiliary agents in calico printing and in the paper industry, as additives to polymer dispersions, as sizes and for dressing leather.

The invention is further illustrated by the following examples in which parts are by weight unless otherwise specified.

Example 1

About 218.5 grams of adipic acid-hexane diol-neopentylglycol polyester (OH number about 63), prepared from 30 mols of adipic acid, 22 mols of 1,6-hexane diol and 12 mols of 1,3-neopentyl glycol, are dried in a vacuum at about 120° C. and then treated with 31.5 grams of 1,6-hexane diisocyanate. The melt is kept at about 120° C. for about two hours and stirred meanwhile, cooled, and dissolved in about 1 liter of tertiary butanol. The resulting solution of the preadduct is slowly added at about 25° C. to about 3.8 grams of ethylene diamine in about 500 ml. of tertiary butanol. After about one-half hour's stirring following the addition, about 24.4 grams of 1,3-propane sultone are added and the mixture left to react for about three hours at about 60° C.

(a) About 733 grams of the reaction mixture are highly concentrated by evaporation in vacuo, about 10.1 grams of triethyl amine are added and about 450 ml. of water are added dropwise and the tertiary butanol remaining is removed in vacuo at about 55° C. An aqueous polyurethane latex of pH 3 remains behind which leaves behaind non-sticky foils.

(b) About 500 grams of the reaction mixture are concentrated by evaporation in vacuo at about 55° C. and about 33.8 ml. of 10% sodium hydroxide are added dropwise and then about 270 ml. of water. When the remaining tertiary butanol has been distilled off, an opaque paste of pH 7 remains behind.

Example 2

About 218.5 grams of adipic acid-hexane diol-neopentyl glycol polyester (OH number about 63) of Example 1 are dried in vacuo at about 120° C. and then reacted with about 52.5 grams of 1,6-hexane diisocyanate for about two hours at about 120° C. After cooling, the melt is dissolved in about 1 liter of tertiary butanol and slowly added to a solution of about 21.7 grams of hexamethylene diamine in about 1 liter of tertiary butanol at about 25° C. It is then stirred for about one-half hour at about 25° C., about 18.7 grams of succinic anhydride in about 100 ml. of acetone are added, and the mixture reacted for about five hours at about 60° C.

About 500 grams of the reaction mixture are concentrated by evaporation in vacuo at about 55° C. and about 13.4 ml. of 10% sodium hydroxide solution and about 230 ml. of water are added dropwise. After distilling off the remaining tertiary butanol, a dispersion is obtained which dries to a very fine crystalline powder.

Example 3

The method is as in Example 2 but with the use of about 218.5 grams of adipic acid-hexane diol-neopentyl glycol polyester (OH number about 63) of Example 1, about 63.0 grams of 1,6-hexane diisocyanate, about 15.25 grams of ethylene diamine and about 25 grams of succinic anhydride. After extensive evaporation of the reaction solution, about 25.2 grams of triethylamine are added and about 900 ml. of water are introduced dropwise. After distilling off the remaining tertiary butanol, a dispersion remains behind which dries to a very fine crystalline powder.

Example 4

About 218.5 grams of adipic acid-hexane diol-neopentyl glycol polyester (OH number about 63) of Example 1 are reacted with about 42.0 grams of 1,6-hexane diisocyanate after half hour's drying at about 20° C. and about 12 mm. Hg. and the reaction mixture is then left for about two hours at about 120° C. After dissolving the melt in about 1 liter of tertiary butanol the solution is added dropwise at about 25° C. into a solution of about 7.52 grams of ethylene diamine in about 1 liter of tertiary butanol. After about one hour, about 13.3 grams of beta-propiolacetone are added and the mixture stirred for about five hours at about 60° C.

(a) About 900 grams of the reaction solution are concentrated by evaporation in vacuo at about 55° C., about 38 ml. of 10% potassium hydroxide solution and about 578 ml. of water are added dropwise and the reaction mixture freed from residual tertiary butanol. The dispersion is weakly alkaline and dries to a solid foil.

(b) After concentration by evaporation, about 55 grams of the reaction solution are treated at about 60° C. with dropwise addition of about 12.2 ml. of 10% sodium hydroxide solution and about 210 ml. of water. After distilling off the remaining organic solvent, a weakly alkaline aqueous dispersion is obtained.

Example 5

About 218.5 grams of adipic acid-hexane diol-neopentyl glycol polyester (OH number about 63) of Example 1 are dried at about 120° C. and about 12 mm. Hg for about 30 minutes and left for about two hours at about 120° C. after the addition of about 45.0 grams of 1,6-hexane diisocyanate. About 18.25 grams of adipic acid dissolved hot in about 200 ml. of acetone are added at about 60° C., about 20 drops of dibutyl tin dilaurate and about 2.0 grams of triethylamine are added and when sufficient viscosity has been attained, the mixture is diluted with about 152 ml. of acetone. After the addition of about 22.8 grams of 1,3-propane sultone and about 17.0 grams of triethylamine, the mixture is heated for about five hours at about 100° C. under excess pressure. After dilution with about 200 ml. of acetone, about 640 ml. of water are added dropwise and the acetone is distilled off in vacuo at about 55° C. The latex obtained has a pH of about 1 to 2.

Example 6

About 218.5 grams of adipic acid-hexane diol-neopentyl glycol polyester (OH number about 63) of Example 1 are treated with about 45.0 grams of 1,6-hexane diisocyanate after about one-half hour's drying at about 120° C., and then left for about two hours at about 120° C. At about 60° C., about 13.0 grams of eopentyl glycol are stirred in and about 10 drops of dibutyl tin dilaurate are added. When a sufficient viscosity is reached, the mixture is diluted with about 350 ml. of acetone and treated with about 22.8 grams of 1,3-propane sultone in about 50 ml. of acetone and about 18.9 grams of triethylamine. After about five hours heating at about 100° C. under excess pressure, about 640 ml. of water are added dropwise at about 55° C. After distilling off the acetone at about 55° C. in vacuo, a thick dispersion of pH 5 is obtained.

Example 7

About 218.5 grams of adipic acid-hexane diol-neopentyl glycol polyester (OH number about 63) of Example 1 are treated with about 31.5 grams of 1,6-hexane diisocyanate after about one-half hour's drying at about 120° C. at 12 mm. Hg and the melt is left for about two hours at about 120° C. After cooling, the melt is dissolved in about 1 liter of tertiary butanol and slowly added at about 250° C. to about 6.4 grams of diethylene triamine in about 500 ml. of tertiary butanol. After about 30 minutes at about 25° C., about 8.5 grams of 1,4-butane sultone are added and the mixture then stirred for about three hours at about 60° C. The product yields elastic, transparent films.

Example 8

About 270 grams of the reaction solution of Example 7 are concentrated by evaporation in vacuo at about 65° C., about 2.3 ml. of about 10% sodium hydroxide solution and about 146 ml. of water are added dropwise and the mixture freed from residual tertiary butanol. A dispersion is obtained which dries to a soft, non-sticky film.

Example 9

About 218.5 grams of adipic acid-hexane diol-neopentyl glycol polyester (OH number about 63) of Example 1 are treated with about 63.0 grams of 1,6-hexane diisocyanate after about one-half hour's drying at about 120° C. and about 12 mm. Hg and then left to stand for about two hours at about 120° C. The melt is dissolved while still hot in about 1.3 liter of tertiary butanol and slowly added at about 25° C. to a solution of about 25.75 grams of diethylene triamine in about 1 liter of tertiary butanol. After about one-half hour, about 30.5 grams of 1,3-propane sultone in about 50 ml. of acetone are added and the mixture then brought to reaction by two hours stirring at about 60° C. The polyurethane sultone yields elastic, trasnparent films.

Example 10

About 500 grams of the reaction solution of Example 9 are extensively concentrated by evaporation in vacuo at about 55° C. and after the addition of about 3.6 grams of dimethylsulphate and dropwise addition of about 250 ml. of water, t is freed from the remaining tertiary butanol. A dispersion is obtained which dries to a soft but non-sticky foil.

Example 11

The procedure is the same as in Example 9 but instead of 1,3-propane sultone, about 25.0 grams of succinic anhydride in about 100 ml. of acetone are added to the solution of the basic polyurethane and the mixture caused to react by stirring for about three hours at about 25° C.

About 500 grams of the reaction solution are extensively concentrated by evaporation in vacuo at about 55° C. and treated with about 8.3 grams of triethanolamine. After dropwise addition of about 200 ml. of water, the remaining tertiary butanol is distilled off. An aqueous collodial solution remains behind.

Example 12

About 218.5 grams of adipic acid-hexane diol-neopentyl glycol polyester (OH number about 63) of Example 1 are treated with about 42.0 grams of 1,6-hexane diisocyanate after about one-half hour's drying at about 120° C. and about 12 mm. Hg and then left for about two hours at about 120° C. The melt is dissolved while still hot in about 1 liter of tertiary butanol and slowly added at about 25° C. to a solution of about 12.88 grams of diethylene triamine in about 1 liter of tertiary butanol. After about one hour, a solution of about 12.5 grams of succinic anhydride in about 50 ml. of acetone is added. The reaction mixture is then stirred for about one hour at about 25° C.

(a) About 500 grams of the reaction solution are extensively concentrated by evaporation in vacuo at about 55° C., treated with about 1.67 grams of triethylamine and dropwise addition of about 200 ml. of water, and freed from the remaining tertiary butanol by distillation in vacuo. A dispersion is obtained which leaves behind a soft film.

(b) After extensive concentration of the reaction solution by evaporation in vacuo at about 55° C., about 12.5 ml. of 10% sodium hydroxide solution are added dropwise to about 500 grams of the reaction solution, and after stirring briefly, about 220 ml. of water are added. The remaining tertiary butanol is distilled off in vacuo. An opaque solution of pH 8 to 9 is obtained which forms a stretchable foil after the water has evaporated off.

(c) The procedure is as under (b) but about 7.1 ml. of 10% sodium hydroxide solution and about 250 ml. of water are used. The dispersion obtained has a pH of 5 and forms a soft, stretchable film.

(d) The procedure is carried out as under (b) but with the use of about 10.0 ml. of 10% potassium hydroxide solution and about 240 ml. of water. A dispersion of pH 5 is obtained. After removal of the water by evaporation, a clear, firm foil is formed.

Example 13

The procedure is carried out as in Example 12 but with the use of about 31.5 grams of 1,6-hexane diisocyanate. The melt dissolved in about 1 liter of tertiary butanol is slowly added at about 25° C. to about 6.44 diethylene triamine in about 500 ml. of tertiary butanol. After subsequently stirring for about one hour, about 6.25 grams of succinic anhydride in about 50 ml. of acetone are added. The mixture is then stirred for about one hour at about 25° C.

About 500 grams of the reaction solution are extensively concentrated by evaporation in vacuo at about 55° C., about 1.1 grams of triethyl amine are added and about 230 ml. of water are introduced dropwise and the remaining tertiary butanol is removed. The dispersion obtained forms clear, firm foils.

Example 14

About 218.5 grams of adipic acid-hexane diol-neopentyl glycol polyester (OH number about 63) of Example 1 are treated with about 105.0 grams of 1,6-hexane diisocyanate after one-half hour's drying at about 120° C. and about 12 mm. Hg and then left for about two hours at about 120° C. The reaction mixture is dissolved while still hot in about 1 liter of tertiary butanol and slowly added at about 25° C. to about 51.5 grams of diethylene triamine in about 1300 ml. of tertiary butanol. The reaction mixture is then stirred for about one hour at about 25° C., a hot solution of about 50 grams of succinic anhydride in about 100 ml. of acetone is added and the mixture then stirred for a further three hours at room temperature. About 500 grams of the reaction solution are treated, after extensive evaporation in vacuo at about 55° C., with dropwise addition of about 41 ml. of 10% sodium hydroxide solution and about 230 ml. of water. After distilling off the remaining tertiary butanol, a clear solution of pH 8 to 9 is obtained which dries to form soft, non-sticky foils.

It is to be understood that the foregoing examples are given for the purpose of illustration and that any other suitable polyurethane, chain extending agent, cyclic compound or the like could be employed therein provided that the teachings of this disclosure are followed.

Although the invention has been described in considerable detail in the foregoing, it is to be understood that such detail is solely for the purpose of illustration and that many variations can be made by those skilled in the art without departing from the spirit and scope of the invention except as set forth in the claims.

What is claimed is:

1. A method of preparing water dispersible polyurethane which comprises reacting a polyurethane having a molecular weight of from about 5,000 to about 2,000,000 with an organic compound having a cyclic ring of 3 to 7 ring members selected from the group consisting of dicarboxylic acid anhydrides, tetracarboxylic acid dianhydrides, disulphonic acid anhydrides, cyclic esters, epoxy carboxylic acids and epoxy sulphonic acids and reacting the resulting product with a base to form a salt of said polyurethane.

2. The product of the method of claim 1.

3. The method of claim 1 wherein the cyclic compound is reacted with the polyurethane at a temperature of 20 to about 150° C.

4. A product prepared by the method of claim 1 wherein said organic compound is a sultone.

5. A water dispersible polyurethane prepared by a process which comprises reacting an hydroxyl polyester having a molecular weight of from about 300 to about 10,000 with an excess of an organic polyisocyanate in a first step and subsequently reacting the resulting polyurethane adduct having free NCO groups with a chain extending agent having a molecular weight below about 500 and having free hydroxyl or free primary amino groups and then reacting the resulting chain extended product with a sultone having 3 to 7 ring members at a temperature of from about 20° C. to about 150° C. and thereafter reacting the resulting product with a base to form a salt-like polyurethane plastic.

6. A product prepared by the method of claim 1 wherein said cyclic ester is a lactone.

7. A water dispersible polyurethane plastic prepared by a process which comprises reacting an excess of 1,6-hexamethylene diisocyanate with an hydroxyl polyester by a process which comprises reacting adipic acid with an excess of hexane diol and neopentyl glycol, reacting the resulting adduct having free NCO groups with a primary diamine to prepare an essentially linear chain extended product which is then reacted with a dicarboxylic acid anhydride and subsequently with a base which will form a salt with the resulting product.

References Cited

UNITED STATES PATENTS 3,284,487 11/1966 Von Brachel ____ 260—77.5 XR
3,317,480 5/1967 Fetscher et al. _____ 260—77.5

FOREIGN PATENTS 827,745 2/1960 Great Britain.

DONALD E. CZAJA, Primary Examiner
M. J. WELSH, Assistant Examiner

U.S. Cl. X.R.

117—132, 142, 148, 155; 161—190; 260—2, 6, 7, 29, 37, 40, 77, 859